US012774254B2

(12) United States Patent
Aoki et al.

(10) Patent No.: US 12,774,254 B2
(45) Date of Patent: Oct. 27, 2026

(54) SILICON NITRIDE SINTERED BODY, WEAR-RESISTANT MEMBER USING THE SAME, AND MANUFACTURING METHOD FOR SILICON NITRIDE SINTERED BODY

(71) Applicants: KABUSHIKI KAISHA TOSHIBA, Tokyo (JP); TOSHIBA MATERIALS CO., LTD., Yokohama (JP)

(72) Inventors: Katsuyuki Aoki, Yokohama Kanagawa (JP); Kai Funaki, Yokohama Kanagawa (JP); Takayuki Fukasawa, Yokohama Kanagawa (JP); Shoya Sano, Yokohama Kanagawa (JP)

(73) Assignee: Niterra Materials Co., Ltd., Yokohama (JP)

( * ) Notice: Subject to any disclaimer, the term of this patent is extended or adjusted under 35 U.S.C. 154(b) by 772 days.

(21) Appl. No.: 17/990,031

(22) Filed: Nov. 18, 2022

(65) Prior Publication Data

US 2023/0080570 A1 Mar. 16, 2023

Related U.S. Application Data

(63) Continuation of application No. PCT/JP2021/018384, filed on May 14, 2021.

(30) Foreign Application Priority Data

May 20, 2020 (JP) ................................ 2020-087825

(51) Int. Cl.

| | |
|---|---|
| ***C04B 35/587*** | (2006.01) |
| ***C04B 35/626*** | (2006.01) |
| ***C04B 35/64*** | (2006.01) |

(52) U.S. Cl.

CPC ........ *C04B 35/587* (2013.01); *C04B 35/6264* (2013.01); *C04B 35/64* (2013.01); *C04B 2235/3873* (2013.01); *C04B 2235/405* (2013.01)

(58) Field of Classification Search

CPC ............................ C04B 35/6264; C04B 35/64

USPC ........................................................ 428/408

See application file for complete search history.

(56) References Cited

FOREIGN PATENT DOCUMENTS

| | | | |
|---|---|---|---|
| JP | S62158167 | A | 7/1987 |
| JP | S63248773 | A | 10/1988 |
| JP | H06080470 | A | 3/1994 |
| JP | H06287006 | A | 10/1994 |
| JP | H07277831 | A | 10/1995 |
| JP | H10231174 | A | 9/1998 |
| JP | 2001114565 | A | 4/2001 |

(Continued)

OTHER PUBLICATIONS

International Search Report for corresponding International Application PCT/JP2021/018384, dated Jul. 21, 2021 (2 pages).

(Continued)

*Primary Examiner* — Zachary M Davis

(74) *Attorney, Agent, or Firm* — Harness, Dickey & Pierce, P.L.C.

(57) ABSTRACT

A silicon nitride sintered body includes at least one black portion with a major axis of 10 μm or more in a field of view with a unit area of 5 mm×5 mm, when observing an arbitrary cross-section of the silicon nitride sintered body using a metallurgical microscope. A major axis of the black portion is Preferably 500 μm or less. The number of the black portion within the field of view with a unit area of 5 mm×5 mm is preferably 2 or more and 10 or less. A segregation portion of Fe is preferably included in the black portion.

17 Claims, 2 Drawing Sheets

(56) References Cited

FOREIGN PATENT DOCUMENTS

| | | | |
|---|---|---|---|
| JP | 5944910 | B2 | 7/2016 |
| JP | 2017075073 | A | 4/2017 |

OTHER PUBLICATIONS

Supplementary European Search Report issued Jun. 5, 2024 for EP Application No. 21809174.2.

SILICON NITRIDE SINTERED BODY, WEAR-RESISTANT MEMBER USING THE SAME, AND MANUFACTURING METHOD FOR SILICON NITRIDE SINTERED BODY

CROSS-REFERENCE TO RELATED APPLICATION

This application is a Continuation application of No. PCT/JP2021/018384, filed on May 14, 2021, and the PCT application is based upon and claims the benefit of priority from Japanese Patent Application No. 2020-087825, filed on May 20, 2020, the entire contents of which are incorporated herein by reference.

FIELD

Embodiments described herein generally relate to a silicon nitride sintered body, a wear-resistant member using the silicon nitride sintered body, and a manufacturing method for the silicon nitride sintered body.

BACKGROUND

A silicon nitride sintered body is used for a wear-resistant member such as a bearing ball and a roller. For the bearing, the grade of its ceramic material is defined by ASTM F2094. ASTM stands for American Society for Testing and Materials. F2094 is Standard Specification for Silicon Nitride Bearing Balls. Grades of ceramic materials are divided into classes 1 to 3 according to three-point bending strength, Vickers hardness, a fracture toughness value, and the like. In addition, bearing balls are graded according to the accuracy of the ball surface. Specifically, grades 2 to 48 are defined by surface roughness Ra. Wear resistance is improved by flattening the surface.

In order to control the surface roughness of the silicon nitride sintered body, polishing is required. The silicon nitride sintered body is a material that is difficult to process because of high strength. For example, Japanese Patent No. 5944910 (Patent Document 1) discloses a silicon nitride sintered body where an area ratio of a grain boundary phase is under control.

In Patent Document 1, both workability and wear-resistance are achieved by controlling the area ratio of the grain boundary phase and the machinable coefficient. However, there is also a demand for further improvement. In Patent Document 1, control of a thixotropy index of the raw material powder may lead to unsatisfactory manufacturability.

DETAILED DESCRIPTION

A silicon nitride sintered body according to the present embodiment includes at least one black portion with a major axis of 10 μm or more in a field of view with a unit area of 5 mm×5 mm, when observing an arbitrary cross-section of the silicon nitride sintered body using a metallurgical microscope.

Figure 1:
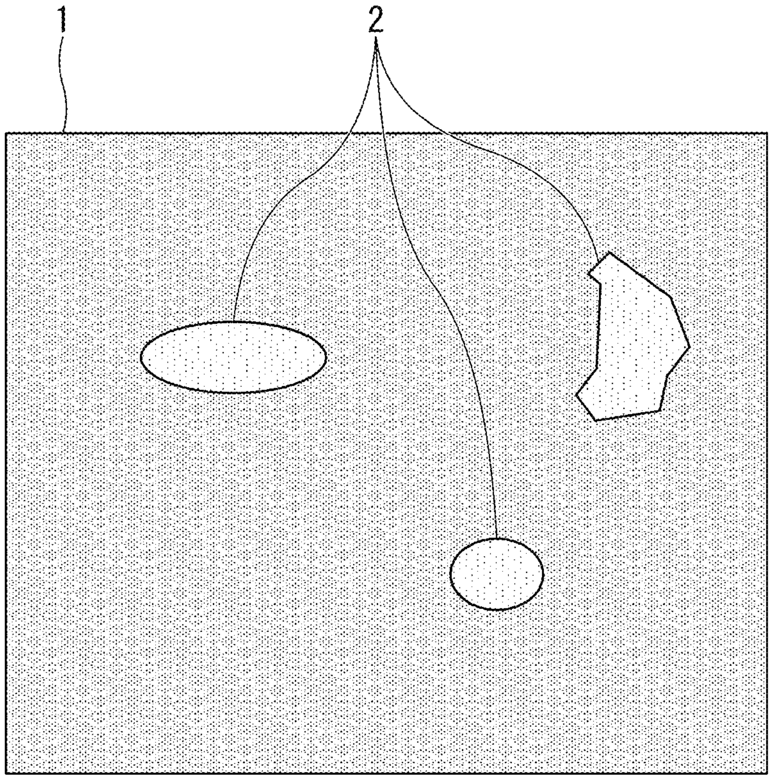
FIG. 1 is a diagram illustrating a cross-section of a silicon nitride sintered body according to one embodiment.
Figure 2:
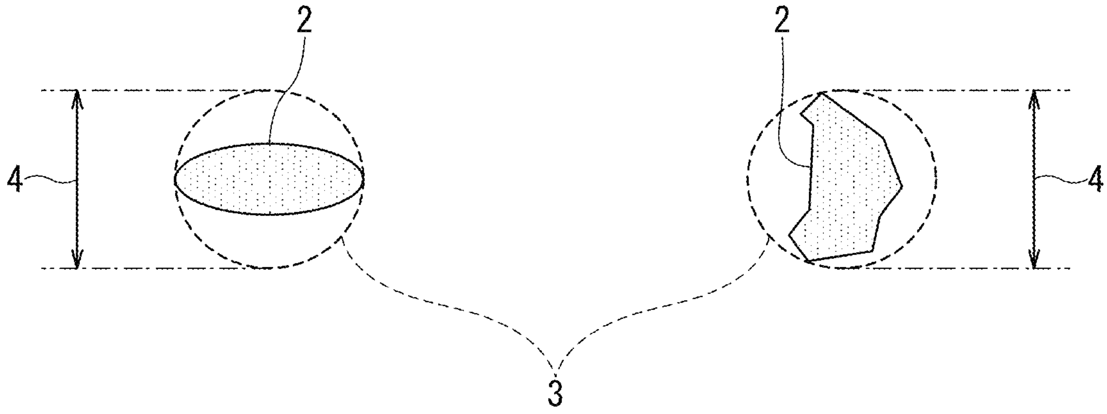
FIG. 2 is a diagram illustrating a black portion.

FIG. 1 illustrates a cross-section of a silicon nitride sintered body according to one embodiment. FIG. 2 illustrates a black portion. In FIG. 1 and FIG. 2, the reference sign 1 denotes the cross-section of the silicon nitride sintered body, the reference sign 2 denotes the black portion, the reference sign 3 denotes a circumscribed circle of the black portion, and the reference sign 4 denotes a major axis (long diameter) of the black portion.

First, an arbitrary cross-section of the silicon nitride sintered body is observed using a metallurgical microscope. The cross-section to be observed is a polished surface with surface roughness Ra of 1 μm or less.

An arbitrary cross-section of the silicon nitride sintered body is observed with an enlarged photograph using a dark field of the metallurgical microscope. For the metallurgical microscope, Olympus BX51M or a microscope having performance equivalent thereto is used. For the digital camera, Panasonic Lumix DMC-G3 or a camera having performance equivalent thereto is used. For example, images acquired by a laser microscope VK-X1000 manufactured by Keyence in a ring mode can be subjected to analysis. Images acquired by the metallurgical microscope are photographed by using the digital camera. The images photographed by the digital camera are analyzed by using software such as Image J or other software having performance equivalent thereto.

The dark field images acquired by the metallurgical microscope at a magnification of 500 times are photographed by the digital camera, and are binarized by Image J analysis in which a threshold value obtained by a "modal method" or a "discriminant analysis binarization method" is applied. If the black portion observable in the dark field images can be distinguished by the threshold value, then it is satisfactory. Each black portion distinguished by this processing is defined as a black portion 2. If the analysis software is capable of applying the discriminant analysis binarization method, such method is used. In the discriminant analysis binarization method, the threshold value is uniquely determined by the analysis software. Thus, it is easy to distinguish the black portion. Note that an enlarged photograph acquired by using the dark field of the metallurgical microscope may simply be referred to as an enlarged photograph in some cases.

The circumscribed circle 3 is set in the black portion 2, and the diameter of the circumscribed circle 3 is defined as the major axis 4 of the black portion 2. The circumscribed circle 3 is a perfect circle in contact with the edge of the black portion 2.

In the silicon nitride sintered body according to the embodiment, one or more black portions with a major axis of 10 μm or more are present in a field of view with a unit area of 5 mm×5 mm in an arbitrary cross-section. This indicates that at least one black portion with a major axis of 10 μm or more is present wherever the unit area of 5 mm×5 mm is observed. In the following, the unit area of 5 mm×5 mm is simply referred to as the unit area in some case. In addition, when the unit area is not included (i.e., cannot be observed) from the viewing position, observation may be divided into a plurality of times. For example, observation of a bearing ball with a diameter of 5 mm or less is divided into a plurality of times. In the case of using a plurality enlarged photographs, the minimum unit is 2 mm×2 mm.

The presence of the black portions 2 improves workability. The black portions 2 indicate that the composition and structure have changed in the silicon nitride sintered body.

The silicon nitride sintered body achieves high strength by homogenizing the silicon nitride crystal grains and the grain boundary phase. However, homogeneous structure may reduce workability. In this context, workability can be improved without degrading the main properties by distributing specific elements under certain conditions or the like. The silicon nitride sintered body according to the embodiment can improve workability by forming the black portions 2.

It is preferred that the major axis of each black portion is 500 μm or less. When the major axis 4 of each black portion is larger than 500 μm, workability improves but wear-resistance may decrease. Thus, the major axis 4 of each black portion is preferably 10 μm or more and 500 μm or less, and is more preferably 30 μm or more and 300 μm or less.

It is preferred that the number of the black portions in a field of view with the unit area of 5 mm×5 mm is 2 or more and 10 or less. When the number of the black portions per unit area is 1, the effect of forming the black portions is small. Conversely, when the number of the black portions per unit area exceeds 10, wear-resistance may decrease. Hence, the number of the black portions per unit area is preferably 2 or more and 10 or less, and is more preferably 2 or more and 6 or less. Regarding the number of the black portions per unit area, only the black portions which contour appear in the enlarged photograph are counted, while the black portions which contour are cut off at the edge of the enlarged photograph will not be counted.

It is preferred that a segregation portion of Fe exists within the black portion. The major axis of the segregation portion of Fe is preferably 1 μm or less.

Figure 3:
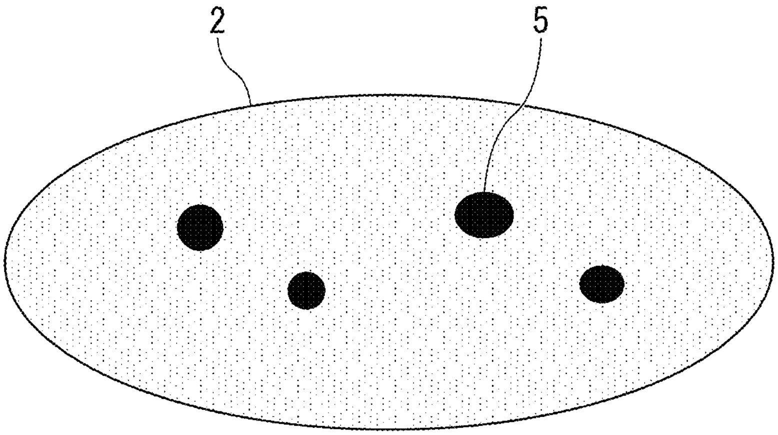
FIG. 3 is a diagram illustrating a segregation portion of Fe in the black portion.
Figure 4:
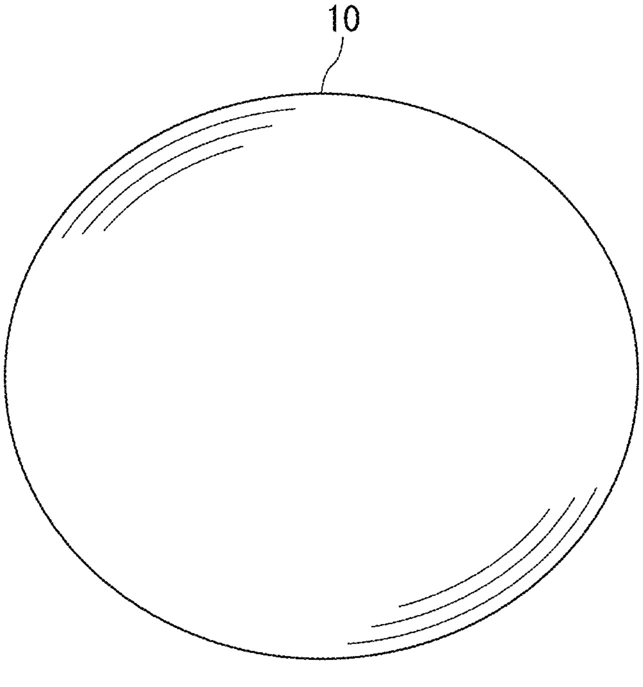
FIG. 4 is a diagram illustrating a bearing ball.

FIG. 3 illustrates the segregation portion of Fe in the black portion. In FIG. 3, the reference sign 2 denotes the black portion and the reference sign 5 denotes the segregation portion of Fe. FIG. 3 illustrates a case where four segregation portions 5 of Fe are distributed in the black portion 2. However, embodiments are not limited to the distribution shown in FIG. 3.

The presence of the segregation portion 5 of Fe in the black portion 2 can be analyzed by using an EPMA (electron probe microanalyzer) and a TEM (transmission electron microscope). For the analysis of the segregation portion 5 of Fe in the black portion 2, EPMA analysis is performed on the above-described cross-section of the enlarged photograph. When there is a part where a quantitative value of Fe is equal to or larger than 0.05 atom percent in the black portion 2, this part is defined as the segregation portion 5 of Fe. For the quantitative analysis of Fe by the EMPA, semiquantitative may be used. The major axis is obtained by observing the segregation portion of Fe using the TEM.

The measurement conditions of the EMPA are an acceleration voltage of 20 kV and an irradiation current of 40 nA. The observation conditions of the TEM are STEM images with an acceleration voltage of 200 kV and a magnification of 20000 or more. A virtual circle of the segregation portion of Fe depicted in the TEM image is drawn, and the diameter of the virtual circle is defined as the major axis of the segregation portion of Fe.

Workability can be further improved by the presence of the segregation portion 5 of Fe in the black portion 2. Fe (iron) is also contained as an impurity in the silicon nitride powder that is the raw material. Conventionally, segregation is avoided in order to prevent Fe from exerting an adverse effect as an impurity. However, it has been found that both workability and wear-resistance can be achieved by setting the major axis of the segregation portion of Fe to 1 μm or less. The lower limit of the major axis of the segregation portion of Fe is not particularly limited, but is preferably 0.05 μm (50 nm) or more. When the major axis of the segregation portion of Fe is less than 0.05 μm, the effect of forming the segregation portion of Fe may be insufficient. Thus, the major axis of the segregation portion of Fe is preferably 0.05 μm or more and 1 μm or less, and is more preferably 0.1 μm or more and 0.8 μm or less.

It is preferred that a plurality of segregation portions of Fe are present in the black portion, and it is preferred that the shortest distance between the plural segregation portions of Fe in the black portion is in the range of 1 μm or more and 20 μm or less.

Workability is improved by the presence of a plurality of segregation portions of Fe in the black portion. The above-described shortest distance between the segregation portions of Fe is the distance between one segregation portion of Fe and its nearest segregation portion of Fe. Workability can be improved by setting the shortest distance between the segregation portions of Fe within the range of 1 μm or more and 20 μm or less.

It is preferred that Silicon (Si) is present in the region of the segregation portion 5 of Fe. Preferably, the region where the amount of detected Fe in the segregation portion 5 is 10 atom percent or more partially coincides with the region where the amount of detected Si is 40 atom percent or more in elemental analysis using TEM-EDS. When Si is detected in the region of the segregation portion 5 of Fe, this indicates the presence of an Fe—Si-based compound. Segregation of Fe as an Fe—Si-based compound enables suppression of decrease in wear-resistance.

In the region of the segregation portion 5 of Fe, the detected oxygen amount is preferably 10 atom percent or less (including the range below the detection limit). When the oxygen amount in the region of the segregation portion 5 of Fe is small, this indicates that the abundance of Fe—Si—O-based compounds is small, which means the proportion of Fe—Si-based compounds without containing oxygen is high. Since the Fe—Si-based compound that does not contain oxygen hardly reacts with rare earth elements, proportion of a compound formed by the Fe—Si-based compound containing no oxygen and rare earth elements is small. Such a small amount of the compounds containing rare earth elements enables distinction from the grain-boundary-phase component containing rare earth elements.

It is preferred that the black portion 2 has a small distribution amount of rare earth elements. Rare earth elements are components to be used as sintering aids. Rare earth elements react with other sintering aids to form grain boundary phases. The silicon nitride sintered body is improved in strength by forming the grain boundary phase containing the rare earth element component. Workability can be further improved by reducing the amount of rare earth elements distributed in the black portion 2.

The distribution of rare earth elements inside and outside the black portion 2 can be analyzed by EPMA. The above-described unit area of 5 mm×5 mm of an arbitrary cross-sections is set as the measurement region. The average amount (atom %) of rare earth elements is measured in both regions outside and inside the black portion 2. It is preferred that the region inside the black portion 2 has smaller amount of rare earth elements than the region outside the black portion 2 by 10 atom percent or more.

Regarding the grain boundary phase outside the black portion 2, it is preferred that variation in the distribution of amount of rare earth elements is less than 10 atom percent. The variation in the distribution amount of rare earth elements in the grain boundary phase outside the black portion 2 is measured by using the EPMA at two positions having the unit area of 5 mm×5 mm. The distribution amount of rare earth elements in the grain boundary phase outside the black portion 2 is measured. It is preferred that the difference in distribution amount of rare earth elements is less than 10 atom percent. This indicates that the state where the black portion 2 is slightly different in composition from the other grain boundary phases is under control.

The silicon nitride sintered body according to the embodiment can have three-point bending strength of 600 MPa or more and a fracture toughness value of 5 MPa·m1/2 or more. Its three-point bending strength can be adjusted to be within the range of 600 MPa or more and 900 MPa or less. ASTM F2094 defines the material classification of bearing balls composed of silicon nitride sintered bodies. It is suitable to provide materials equivalent to class 2 and class 3 for the silicon nitride sintered body according to the embodiment.

Three-point bending strength is measured in accordance with JIS-R-1601 (2008). The fracture toughness value is calculated on the basis of an IF method in JIS-R-1607 (2015) by using Niihara's equation. JIS-R-1601 (2008) complies with ISO14704, and JIS-R-1607 (2015) complies with ISO15732.

The above-described silicon nitride sintered body is suitable for a wear-resistant member. Wear-resistant members include a bearing ball. A bearing ball is a rolling element applied in various bearings such as a ball bearing, a roller bearing, and a roll bearing. Wear-resistant members can also be applied to rollers and engine components. Rollers can be applied in various products such as those for rolling, transportation, and transcription. Engine components can be applied in various products such as a check ball, a cam roller, a wear pad, and a plunger.

It is preferred that surface roughness Ra of the sliding surface of the wear-resistant member is 1 μm or less. The wear-resistant member slides with respect to its opposite material. For example, in a bearing, bearing balls are disposed between its inner ring and its outer ring. In the case of the bearing ball, its entire surface functions as a sliding surface. Wear-resistance is improved by reducing the surface roughness Ra of the sliding surface of the wear-resistant member. According to ASTM (American Society for Testing and Materials) F2094, the surface roughness Ra of bearing balls is set to 0.013 μm or less.

In order to reduce the surface roughness Ra of the sliding surface to 1 μm or less, polishing processing is required, such as a processing using a grindstone (including abrasive grains). The polishing processing using a grindstone may include lapping, polishing, and the like. The polishing processing also includes chemical polishing and electrolytic polishing.

The polishing processing is processing of scraping the surface of the silicon nitride sintered body. As shown in Patent Document 1, processing performed on the surface of the silicon nitride sintered body is divided into rough processing and finishing processing. The rough processing is classified into a brittle mode, and the finishing processing is classified into a ductile mode. The silicon nitride sintered body according to the embodiment is improved in workability in the rough processing. The rough processing is performed by using grindstones having different grit size that are sorted and numbered. In this case, the grindstones (including abrasive grains) of #80 to #1500 are used. The processing time can be shortened by improving workability.

As to wear-resistance, it is satisfactory. For example, a wear-resistance test for a bearing ball includes a rolling test in which a bearing ball is rolled on a bearing steel (SUJ2) plate material under conditions of a maximum contact stress of 3.7 GPa and a rotation speed of 1200 rpm. In this rolling test, a strass-type bearing tester is used. This is a method of measuring time length until problem such as cracking and breaking of the bearing-ball surface occurs under such conditions. The bearing ball composed of the silicon nitride sintered body according to the embodiment has a durability of 400 hours, or even 600 hours in the above-described rolling test.

As described above, the silicon nitride sintered body according to the embodiment is equivalent to material classes 2 to 3 in ASTM F2094, i.e., intermediate level in material performance, but exhibit excellent durability in low stress condition. In other words, it is suitable for use under a maximum contact stress of 3.7 GPa or less.

Next, a manufacturing method for the silicon nitride sintered body according to the embodiment will be described. As long as the silicon nitride sintered body of the embodiment has the above-described structure, its manufacturing method is not particularly limited. The following method is introduced as an example for manufacturing the above-described silicon nitride sintered body with satisfactory yield.

First, silicon nitride powder is prepared. It is preferred that the silicon nitride powder has an Fe content of 20 wtppm or more. Fe contained in the silicon nitride powder may be Fe as an impurity. When the content of Fe as an impurity is less than 20 wtppm, Fe may be added. When Fe is added, it may be added as iron oxide.

Use of the silicon nitride powder containing Fe enables presence of segregation portions of Fe in the black portions.

The silicon nitride powder containing Fe facilitates control of the dispersion state of the segregation portions of Fe. The upper limit of content of Fe in the silicon nitride powder is preferably 3000 wtppm or less. When it exceeds 3000 wtppm, it may lead to formation of a large structural defect in the structure of the sintered body, and the wear-resistance may decrease. Thus, content of Fe in the silicon nitride powder is preferably 20 wtppm or more and 3000 wtppm or less, and is more preferably 100 wtppm or more and 2000 wtppm or less.

The silicon nitride powder preferably has an average particle size of 2 μm or less, an oxygen content of 4% by weight or less, and an a conversion rate of 85% or more.

Next, sintering aid powder is prepared. The sintering aid preferably contains rare earth elements in a content of 1% by weight or more and 12% by weight or less in terms of oxide. Rare earth elements include yttrium (Y) and lanthanide elements. As the lanthanoid elements, one selected from cerium (Ce), neodymium (Nd), erbium (Er), and ytterbium (Yb) is preferable. Rare earth elements may be added as rare-earth-element compounds such as oxides and oxynitrides. When rare earth elements are denoted as R elements, the oxide conversion is performed on the assumption that the oxide composition of all R elements is R2O3. When Ce is used, the conversion is performed with CeO2. When two or more elements are selected from rare earth elements and used, its total amount is preferably 1% by weight or more and 12% by weight or less in terms of oxide conversion.

The content of aluminum is preferably 1% by weight or more and 10% by weight or less in terms of oxide conversion. Aluminum (Al) may be added as aluminum compounds such as oxides, nitrides, oxynitrides, and composite oxides, and two or more of those may be used. The oxide conversion of aluminum is performed with Al2O3.

One or more elements selected from the group 4A elements, the group 5A elements, and the group 6A elements shown in the Japanese Periodic Table may be used in a total amount of 1% by weight or more and 5% by weight or less in terms of oxide conversion. The notations of the group 4A elements, the group 5A elements, and the group 6A elements are based on the Japanese periodic table.

The group 4A elements are titanium (Ti), zirconium (Zr), and hafnium (Hf). These oxide conversions are performed with TiO2, ZrO2, and HfO2, respectively.

The group 5A elements are vanadium (V), niobium (Nb), and tantalum (Ta). These Oxide conversions are performed with V2O5, Nb2O3, and Ta2O3, respectively.

The group 6A elements are chromium (Cr), molybdenum (Mo), and tungsten (W). These oxide conversions are performed with Cr2O3, MoO3, and WO3, respectively.

The group 4A elements, the group 5A elements, and the group 6A elements may be added as compounds such as oxides, carbides, nitrides, and oxynitrides. Each of the group 4A elements, the group 5A elements, and the group 6A is hereinafter referred to as the M element.

The rare-earth-element compound and the aluminum compound react in a sintering process to form the grain boundary phase. The grain boundary phase becomes a (rare earth element)-(aluminum)-(oxygen)-based compound. It is satisfactory if the (rare earth element)-(aluminum)-(oxygen)-based compound contains a rare earth element, aluminum, and oxygen as constituent elements. Its other constituent elements include silicon (Si) and nitrogen (N).

The M element (including an M-element compound) is a component that strengthens the grain boundary phase. Addition of the M element strengthens the grain boundary phase. Strengthening the grain boundary phase can improve strength of the silicon nitride sintered body. Thus, the M element may be added depending on the desired strength. As a component for strengthening the grain boundary phase, silicon carbide (SiC) can also be used. When silicon carbide is added, the additive amount is preferably 1% by weight or more and 5% by weight or less. When the additive amount of the M element is less than 1% by weight, the effect of the addition may be insufficient. When the additive amount exceeds 5% by weight, the silicon nitride sintered body may be colored and this coloration may complicate the observation of presence/absence of the black portion.

A raw-material mixing step is performed to mix the silicon nitride powder and the sintering aid powder. It is preferred to use a sintering aid powder having an average particle size of 2 μm or less. It is preferred to use a pulverizer in the raw-material mixing step. As the pulverizer may be a ball mill, a bead mill or the like. Moreover, the raw-material mixing step may be either wet mixing or dry mixing.

The raw-material mixing step is preferably performed by the wet mixing using water, which reacts with the silicon nitride powder to produce free Si. The free Si readily reacts with Fe. The Fe—Si compound readily becomes segregation portions of Fe that promotes the formation of the black portions. The wet mixing using water may be used in the mixing step including pulverization. Although the water may be any one of industrial water, tap water, and pure water, it is preferred to use pure water where concentration of impurities such as the group 1A elements, the group 2A elements, and halogen elements is reduced. This pulverization and mixed solution are preferably adjusted to be alkaline, which means that the mixed solution of the water and the silicon nitride powder shows a value exceeding pH 7. It is preferred that zeta potential of the silicon nitride powder surface in the mixed solution of the water and the silicon nitride powder is negative. Further, the mixed solution of the water, the silicon nitride powder, and the sintering aid powder may exceed 7 pH. The group 1A elements and the group 2A elements are based on the Japanese Periodic Table. Thus, the group 1A elements are hydrogen and the like, while the group 2A elements are magnesium and the like.

The generation of free Si is considered to involve the following reactions.

Si3N4+6H2O→3SiO2+4NH3

SiO2+2H2O→Si(OH)4

The zeta potential of the silicon nitride powder surface can be made negative by adjusting the mixed solution to be alkaline in the wet mixing using water. The negative potential can be increased by setting the value to 9 pH or more. When the zeta potential of the silicon nitride powder surface is negative, the surface attracts cations. Therefore Fe ions, which are cations, can be readily collected on the silicon nitride powder surface. This facilitates the formation of Fe—Si compounds. The zeta potential is the potential of the slip surface here liquid begins to flow in the electric double layer formed around the powder. When the zeta potential is positive, anions are attracted. When the zeta potential is negative, cations are attracted. This property is utilized to facilitate collection of Fe ions on the silicon nitride powder surface.

After performing the raw-material mixing step, a binder is added to prepare raw material slurry. The preparation of the raw material slurry is preferably performed by using a pulverizer such as a ball mill.

Next, granulation is performed as necessary by using the obtained raw material slurry, and then a molding step for preparing a molded body is performed. The molding step can be performed by metal die molding, cold isostatic pressing (CIP), or the like. It is preferred that the molding pressure is 100 MPa or more.

Next, a degreasing step for degreasing the molded body is performed. It is preferred that the degreasing step is performed within the temperate range of 300° C. or higher and 700° C. or lower. The degreasing step is performed in the air or in a non-oxidizing atmosphere, and the atmosphere is not particularly limited.

Next, a sintering step for sintering the degreased body is performed. It is preferred that the sintering step is performed within the temperate range of 1600° C. or higher and 1900° C. or lower. The sintering step may be either normal pressure sintering or pressure sintering. The sintering step may be performed under any one of a normal pressure sintering method and a pressure sintering method. It is preferred that the sintering step is performed in a non-oxidizing atmosphere. The non-oxidizing atmosphere includes a nitrogen atmosphere and an argon atmosphere. Further, vacuum treatment is desirably performed in such a manner that the sintering object is kept in a vacuum atmosphere from the start of the sintering step until the temperature reaches 1450° C. The vacuum atmosphere is an atmosphere under a pressure of 100 Pa or less. A process of holding the sintering object for 1 hour or more in the vacuum atmosphere at 1200° C. or higher and 1450° C. or lower is performed. Afterward, the normal pressure sintering or the pressure sintering is performed in the non-oxidizing atmosphere. Such vacuum treatment is meant for enhancing self-decomposition of silicon nitride that produces Si, which facilitate composition with Fe element.

If necessary, the obtained sintered body is subjected to a hot isostatic pressing (HIP) step. It is preferred that the HIP step is performed within the temperate range of 1500° C. to 1900° C. It is preferable to apply a pressure of 30 MPa or more in the non-oxidizing atmosphere.

Through the above-described steps, the silicon nitride sintered body according to the embodiment can be produced. The silicon nitride sintered body becomes a wear-resistant member by subjecting the portion expected to be the sliding surface to polishing. It is preferred that the surface roughness Ra of the sliding-surface-to-be portion is 1 μm or less.

EXAMPLES

Examples 1 to 9 and Comparative Examples 1 and 2

As the silicon nitride powder, samples shown in Table 1 were prepared.

TABLE 1

| | Average particle size [μm] | Fe content [wtppm] |
|---|---|---|
| Silicon nitride powder 1 | 2.0 | 2000 |
| Silicon nitride powder 2 | 1.2 | 1000 |
| Silicon nitride powder 3 | 0.7 | 500 |

Next, the step of adding and mixing the sintering aid powder was performed as shown in Table 2. The additive amount of the sintering aid component was 100% by weight in total combining the silicon nitride powder and the sintering aid powder. For the mixed solution composed of the silicon nitride powder, the sintering aid powder, and the water to be adjusted to be alkaline, it was set to 9 pH or higher. The mixing step is performed by using a ball mill. In the mixing step, a binder was also added to prepare the raw material slurry.

TABLE 2

| | Silicon nitride powder | Sintering aid component [Additive amount wt %] | Solvent in mixing step | pH of mixture | Zeta potential of silicon nitride powder surface |
|---|---|---|---|---|---|
| Example 1 | Silicon nitride powder 1 | $Y_2O_3$ [9] $Al_2O_3$ [3] | Pure water | Alkaline | Minus |
| Example 2 | Silicon nitride powder 1 | $Y_2O_3$ [2] $Al_2O_3$ [2] | Pure water | Alkaline | Minus |
| Example 3 | Silicon nitride powder 2 | $Y_2O_3$ [5] $Al_2O_3$ [5] | Pure water | Alkaline | Minus |
| Example 4 | Silicon nitride powder 2 | $Y_2O_3$ [4] $Al_2O_3$ [8] | Pure water | Alkaline | Minus |
| Example 5 | Silicon nitride powder 3 | $Y_2O_3$ [8] $Al_2O_3$ [2] | Pure water | Alkaline | Minus |
| Example 6 | Silicon nitride powder 3 | $Y_2O_3$ [4] $Al_2O_3$ [7] | Pure water | Alkaline | Minus |
| Example 7 | Silicon nitride powder 2 | $Y_2O_3$ [5] $Al_2O_3$ [5] $TiO_2$ [1] | Pure water | Alkaline | Minus |
| Example 8 | Silicon nitride powder 2 | $Y_2O_3$ [5] $Al_2O_3$ [5] | Pure water | Alkaline | Minus |
| Example 9 | Silicon nitride powder 1 | $Y_2O_3$ [2] $A_{l2}O_3$ [2] $Fe_2O_3$ [1] | Pure water | Alkaline | Minus |
| Comparative Example 1 | Silicon nitride powder 3 | $Y_2O_3$ [3] $Al_2O_3$ [6] $HfO_2$ [2] $Mo_2C$[1] SiC [3] | Organic solvent | — | — |
| Comparative Example 2 | Silicon nitride powder 3 | $Y_2O_3$ [5] $Al_2O_3$ [5] | Pure water | Acidic | Plus |

The obtained raw material slurry was subjected to metal-die press molding at a molding pressure of 100 MPa or higher. Next, the obtained molded body was subjected to a degreasing step at 450° C. in the air. The degreased body was then sintered. The sintering step is as shown in Table 3.

TABLE 3

| | Sintering step | | | | |
|---|---|---|---|---|---|
| | Vacuum treatment [100 Pa or less] | | Main Sintering | HIP | |
| | Highest temperature [° C.] | Holding time [h] | Holding temperature [° C.] × Time [h] | Holding temperature [° C.] × Time [h] | Pressure [MPa] |
| Example 1 | 1400 | 2 | 1700 × 6 | 1600 × 1 | 80 |
| Example 2 | 1300 | 4 | 1650 × 8 | 1550 × 1 | 100 |
| Example 3 | 1350 | 2 | 1750 × 6 | 1650 × 1 | 120 |
| Example 4 | 1400 | 1 | 1800 × 5 | 1650 × 1 | 80 |
| Example 5 | 1300 | 3 | 1700 × 10 | 1600 × 2 | 80 |
| Example 6 | 1350 | 2 | 1850 × 5 | 1650 × 2 | 70 |
| Example 7 | 1350 | 2 | 1820 × 6 | 1650 × 2 | 120 |
| Example 8 | 1350 | 2 | 1780 × 8 | — | — |
| Example 9 | 1300 | 4 | 1800 × 6 | 1650 × 2 | 100 |
| Comparative Example 1 | — | — | 1700 × 6 | 1600 × 1 | 80 |
| Comparative Example 2 | 1400 | 1 | 1700 × 6 | 1600 × 1 | 80 |

As shown in the table, Examples 1 to 9 and Comparative Example 2 were subjected to the vacuum treatment. The vacuum treatment was performed by raising the temperature from room temperature to the maximum temperature in a vacuum of 100 Pa or less. The highest temperature was maintained for a predetermined time. Afterward, normal pressure sintering was performed in a nitrogen atmosphere. A silicon nitride sintered body was obtained by subjecting the obtained sintered body to HIP treatment. Note that the HIP treatment was not performed in Example 8. In Comparative Example 1, the vacuum treatment was not performed.

The presence/absence of black portions, three-point bending strength, and a fracture toughness value of the obtained silicon nitride sintered body were measured.

The presence/absence of black portions was measured by observing an arbitrary cross-section using a metallurgical microscope. The measurement conditions are what described above.

Additionally, the three-point bending strength is measured on the basis of MS-R-1601. The fracture toughness value is calculated on the basis of an IF method in JIS-R-1607 by using Niihara's equation.

The measurement results are shown in Tables 4 and 5 below.

TABLE 4

| | black portion [unit area of 5 mm × 5 mm] | | Segregation portion of Fe | | |
|---|---|---|---|---|---|
| | The number of pieces with major axis of 10 μm | Maximum length of major axis [μm] | Length of major axis [μm] | The number in black portion | Shortest distance between segregation portions of Fe [μm] |
| Example 1 | 7 | 51 | 0.7 | 12 | 2 |
| Example 2 | 2 | 431 | 0.8 | 26 | 1 |
| Example 3 | 3 | 140 | 0.1 | 5 | 3 |
| Example 4 | 3 | 122 | 0.2 | 8 | 2 |
| Example 5 | 1 | 85 | 0.2 | 4 | 13 |
| Example 6 | 2 | 82 | 0.2 | 6 | 9 |
| Example 7 | 2 | 157 | 0.2 | 7 | 2 |
| Example 8 | 9 | 436 | 0.7 | 18 | 1 |
| Example 9 | 28 | 634 | 5 | 72 | 10 |
| Comparative Example 1 | 0 | 0 | 0 | 0 | 0 |
| Comparative Example 2 | 0 | 3 | 0.1 | 1 | 0 |

TABLE 5

| | Three-point bending strength [MPa] | Fracture toughness value [MPa · $m^{1/2}$] |
|---|---|---|
| Example 1 | 761 | 5.6 |
| Example 2 | 850 | 6.5 |
| Example 3 | 827 | 6.3 |
| Example 4 | 775 | 5.8 |
| Example 5 | 830 | 6.0 |
| Example 6 | 844 | 6.1 |
| Example 7 | 879 | 6.4 |
| Example 8 | 630 | 5.6 |
| Example 9 | 755 | 5.4 |
| Comparative Example 1 | 950 | 5.5 |
| Comparative Example 2 | 610 | 6.3 |

As can be seen from Table 5, the silicon nitride sintered bodies according to the examples were equivalent to classes 2 to 3 in ASTM F2094. Comparative Example 1 was equivalent to class 1.

The workability and durability of the silicon nitride sintered bodies according to Examples and Comparative Examples were measured.

As a workability test, the processing time required for producing a bearing ball was measured. As the rough processing performed on the surface, a polishing disk made of #80 diamond abrasive grains and a polishing disk made of #120 diamond abrasive grains are used. The mass of each sample before polishing was measured, and the mass of each sample after polishing performed under a constant load for a fixed period of time was measured again. The mass change rate before and after polishing was measured. The mass change rate during the processing is shown as a ratio by defining the mass change rate of Comparative Example 1 as 100. A larger value of the mass change rate means more polishing was performed in comparison with Comparative Example 1 during the same period of polishing time.

As the finishing processing performed on the surface, diamond loose grains were used. The surface roughness Ra before polishing was measured, and the surface roughness Ra after polishing performed for a certain period of time was measured. A change rate (Ra change rate) of surface roughness before and after polishing was obtained. The Ra change rate is shown as a ratio by defining the Ra change rate of Comparative Example 1 as 100. A larger value of the Ra change rate means that the surface roughness Ra can be made finer and the flattening processing is easier in comparison with the case of Comparative Example 1 during the same period of polishing time.

Each sintered body was processed into a bearing ball (9.525 mm in diameter) having a surface roughness Ra of 0.01 μm, and a durability test was performed on the obtained bearing ball. In the durability test, under the conditions of maximum contact pressure of 3.7 GPa and rotation speed of 1200 rpm, a rolling-fatigue-test in which each bearing ball was rolled on a bearing steel (SUJ2) plate was performed by using a thrust-type bearing tester. After this rolling-fatigue test, a bearing ball that has no defects, such as a surface crack and a partial loss, even after 400 hours or 600 hours under the test is then marked "○" indicative of a non-defective product, and a bearing ball having a defect is marked "x" indicative of an unusable product.

The results are shown in Table 6.

TABLE 6

| | Workability | | | Durability | |
|---|---|---|---|---|---|
| | Rough processing #80 | Rough processing #120 | Finishing processing | After 400 hours | After 600 hours |
| Example 1 | 132 | 135 | 104 | ○ | ○ |
| Example 2 | 112 | 117 | 100 | ○ | ○ |
| Example 3 | 119 | 119 | 101 | ○ | ○ |
| Example 4 | 128 | 130 | 101 | ○ | ○ |
| Example 5 | 115 | 117 | 100 | ○ | ○ |
| Example 6 | 109 | 112 | 101 | ○ | ○ |
| Example 7 | 110 | 109 | 100 | ○ | ○ |
| Example 8 | 129 | 122 | 100 | ○ | x |
| Example 9 | 140 | 118 | 100 | ○ | x |
| Comparative Example 1 | 100 | 100 | 100 | | ○ |
| Comparative Example 2 | 98 | 98 | 96 | ○ | x |

As is clear from the table, the silicon nitride sintered bodies according to the examples have improved in workability, especially the workability of the rough processing. As to durability, satisfactory results were obtained in every example of 400-hour test. However, regarding Examples 8 to 10, defects were observed after 600 hours of test. This is because Example 8 was not subjected to the HIP treatment, while Example 9 was out of the preferred range of the major axis of the black portion.

Examples 8 and 9 show excellent durability up to 400 hours. In other words, both can be satisfactorily used in a field where the maximum contact pressure is 3.7 GPa or less and the guaranteed durability time is 400 hours or less.

According to the silicon nitride sintered body of the present embodiment, satisfactory workability and wear-resistance can both be achieved. In particular, according to the silicon nitride sintered body of the present embodiment, satisfactory workability and wear-resistance can both be achieved in a silicon nitride sintered body equivalent to classes 2 to 3 in ASTM F2094.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A silicon nitride sintered body comprising at least one black portion with a major axis of 10 μm or more in a field of view with a unit area of 5 mm×5 mm, when observing an arbitrary cross-section of the silicon nitride sintered body using a metallurgical microscope, the black portion being obtained by binarizing a dark field image taken at a magnification of 500 times using a metallurgical microscope with analysis software, wherein a segregation portion of Fe—Si-based compound is present in the black portion, a quantitative value of Fe—Si-based compound in the segregation portion of Fe is 0.05 atom percent or more, as measured by an electron probe analyzer and transmission electron microscope, and a region inside the black portion has a smaller average amount of rare earth elements than a region outside the black portion by 10 atom percent or more.

2. The silicon nitride sintered body according to claim 1, wherein a major axis of the black portion is 500 μm or less.

3. The silicon nitride sintered body according to claim 1, wherein number of the black portion within the field of view with a unit area of 5 mm×5 mm is 2 or more and 10 or less.

4. The silicon nitride sintered body according to claim 1, wherein a major axis of the segregation portion of Fe—Si-based compound is 1 μm or less.

5. The silicon nitride sintered body according to claim 1, wherein a plurality of segregation portions of Fe—Si-based compound is included in the black portion.

6. The silicon nitride sintered body according to claim 1, wherein a plurality of segregation portions of Fe—Si-based compound are included in the black portion; and shortest distance between the plurality of segregation portions of Fe—Si-based compound is 1 μm or more and 20 μm or less.

7. A wear-resistant member comprising the silicon nitride sintered body according to claim 1.

8. The wear-resistant member according to claim 7, wherein surface roughness Ra is 1 μm or less.

9. The wear-resistant member according to claim 7, wherein the wear-resistant member is a bearing ball.

10. A wear-resistant member comprising the silicon nitride sintered body according to claim 6.

11. The wear-resistant member according to claim 10, wherein surface roughness Ra is 1 μm or less.

12. The wear-resistant member according to claim 11, wherein the wear-resistant member is a bearing ball.

13. A manufacturing method for a silicon nitride sintered body used for the wear-resistant member according to claim 1, comprising: a raw-material mixing step; a molding step; and a sintering step, wherein the raw-material mixing step is a step in which: wet mixing is performed by using silicon nitride powder and water; and mixed solution of the silicon nitride powder and the water is adjusted to be alkaline.

14. A manufacturing method for a silicon nitride sintered body comprising: a raw-material mixing step; a molding step; and a sintering step, wherein the raw-material mixing step is a step in which: wet mixing is performed by using silicon nitride powder and water; and mixed solution of the silicon nitride powder and the water is adjusted to be alkaline.

15. The manufacturing method for a silicon nitride sintered body according to claim 14, wherein the silicon nitride powder, sintering aid powder, and the water are used in the wet mixing.

16. The manufacturing method for a silicon nitride sintered body according to claim 14, wherein the mixed solution is set to 9 pH or higher in the wet mixing.

17. The manufacturing method for a silicon nitride sintered body according to claim 14, wherein the silicon nitride powder contains Fe as an impurity of 20 wtppm or more and 3000 wtppm or less.

* * * * *